United States Patent
Chandrasekhar et al.

(10) Patent No.: US 11,797,319 B2
(45) Date of Patent: Oct. 24, 2023

(54) COPY AND PASTE IN VIRTUAL CONSOLE WITH KEYBOARD PLAY

(71) Applicant: Dell Products L.P., Round Rock, TX (US)

(72) Inventors: Babu Chandrasekhar, Round Rock, TX (US); Rajeshkumar Ichchhubhai Patel, Bangalore (IN); Jitendra Kumar, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 361 days.

(21) Appl. No.: 16/408,914

(22) Filed: May 10, 2019

(65) Prior Publication Data

US 2020/0356389 A1    Nov. 12, 2020

(51) Int. Cl.
*G06F 9/451*     (2018.01)
*G06F 3/0481*    (2022.01)
*G06F 13/10*     (2006.01)
*G06F 13/42*     (2006.01)

(52) U.S. Cl.
CPC ............ *G06F 9/452* (2018.02); *G06F 3/0481* (2013.01); *G06F 13/107* (2013.01); *G06F 13/4282* (2013.01); *G06F 2213/0042* (2013.01)

(58) Field of Classification Search
CPC ...... G06F 3/0486; G06F 9/543; G06F 21/305; G06F 3/04886; G06F 9/452; G06F 13/107; G06F 3/0481; G06F 13/4282; G06F 2213/0042; G06F 9/45558; G06F 2009/45579

See application file for complete search history.

(56) References Cited

U.S. PATENT DOCUMENTS

| | | | |
|---|---|---|---|
| 2001/0044843 A1* | 11/2001 | Bates | G06F 13/4022 709/224 |
| 2009/0019535 A1* | 1/2009 | Mishra | G06Q 30/04 726/12 |
| 2009/0328033 A1* | 12/2009 | Kohavi | G06F 9/5027 718/1 |

(Continued)

OTHER PUBLICATIONS

Understanding the 'Clipboard' menu under Hyper-V. (article) [online]. Virtual PC Guy Blog. Archived Jul. 7, 2012. Retrieved on Oct. 7, 2022. https://web.archive.org/web/20120707031247/http://blogs.msdn.com/b/virtual_pc_guy/archive/2008/01/15/understanding-the-clipboard-menu-under-hyper-v.aspx (Year: 2012).*

*Primary Examiner* — John T Repsher, III
(74) *Attorney, Agent, or Firm* — Jackson Walker L.L.P.

(57) ABSTRACT

An information handling system may include a host system that includes a host system processor and a host system memory coupled to the host system processor. The information handling system may further include a management controller configured to provide out-of-band management of the host system. The management controller may be configured to establish a virtual console session between the host system and a remote terminal. The management controller may further be configured to, in response to a command from the remote terminal to send data from the remote terminal to the host system, receive the data from the remote terminal; and transmit the data to the host system character-by-character via a keyboard interface of the host system.

12 Claims, 2 Drawing Sheets

(56) References Cited

U.S. PATENT DOCUMENTS

| | | | |
|---|---|---|---|
| 2010/0111410 A1* | 5/2010 | Lu | G06F 3/1462 |
| | | | 382/166 |
| 2011/0185072 A1* | 7/2011 | Varadarajan | G06F 9/452 |
| | | | 709/228 |
| 2014/0359615 A1* | 12/2014 | Chuang | G06F 9/45558 |
| | | | 718/1 |
| 2015/0095795 A1* | 4/2015 | Zhang | G06F 9/45558 |
| | | | 715/748 |
| 2015/0193308 A1* | 7/2015 | Hung | G06F 11/076 |
| | | | 714/704 |
| 2016/0044025 A1* | 2/2016 | Goyal | G06F 21/42 |
| | | | 726/6 |
| 2018/0255134 A1* | 9/2018 | Goli | H04L 67/1095 |
| 2018/0307327 A1* | 10/2018 | Tran | G06F 3/02 |
| 2019/0354625 A1* | 11/2019 | Toudji | G06F 16/248 |
| 2020/0042324 A1* | 2/2020 | Ayolasomyajula | H04L 63/20 |
| 2020/0136418 A1* | 4/2020 | Jenne | G06F 1/1635 |

* cited by examiner

COPY AND PASTE IN VIRTUAL CONSOLE WITH KEYBOARD PLAY

TECHNICAL FIELD

The present disclosure relates in general to information handling systems, and more particularly to systems and methods for exchanging information (e.g., clipboard information) in a virtual console environment. This application is related to U.S. patent application Ser. No. 16/381,257, which was filed on Apr. 11, 2019, and which is incorporated by reference herein.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

As described in further detail below, management controllers may be used to provide management facilities for information handling systems. In particular, a management controller may provide management facilities to allow a user/administrator to control a host system of an information handling system via a virtual console interface.

It may be advantageous for such a user to be able to transmit clipboard data (e.g., by cutting, copying, and pasting data) to the host system that is under management. Although some existing management solutions such as Virtual Network Computing (VNC) may allow for clipboard data exchange in some circumstances, such existing systems must generally be run on the host system itself to allow for such exchange. For a virtual console that is enabled via a management controller of a host system, rather than the host system itself, existing solutions have thus far been lacking.

It should be noted that the discussion of a technique in the Background section of this disclosure does not constitute an admission of prior-art status. No such admissions are made herein, unless clearly and unambiguously identified as such.

SUMMARY

In accordance with the teachings of the present disclosure, the disadvantages and problems associated with remote management of information handling systems may be reduced or eliminated.

In accordance with embodiments of the present disclosure, an information handling system may include a host system that includes a host system processor and a host system memory coupled to the host system processor. The information handling system may further include a management controller configured to provide out-of-band management of the host system. The management controller may be configured to establish a virtual console session between the host system and a remote terminal. The management controller may further be configured to, in response to a command from the remote terminal to send data from the remote terminal to the host system, receive the data from the remote terminal; and transmit the data to the host system character-by-character via a keyboard interface of the host system.

In accordance with these and other embodiments of the present disclosure, a method may include establishing, by a management controller that is configured to provide out-of-band management of a host system of an information handling system, a virtual console session between the host system and a remote terminal; in response to a command from the remote terminal to send data from the remote terminal to the host system, the management controller receiving the data from the remote terminal; and the management controller transmitting the data to the host system character-by-character via a keyboard interface of the host system.

In accordance with these and other embodiments of the present disclosure, an article of manufacture may include a non-transitory, computer-readable medium having computer-executable code thereon that is executable by a processor of a management controller of an information handling system for: establishing a virtual console session between a host system of the information handling system and a remote terminal; in response to a command from the remote terminal to send data from the remote terminal to the host system, receiving the data from the remote terminal; and transmitting the data to the host system character-by-character via a keyboard interface of the host system.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
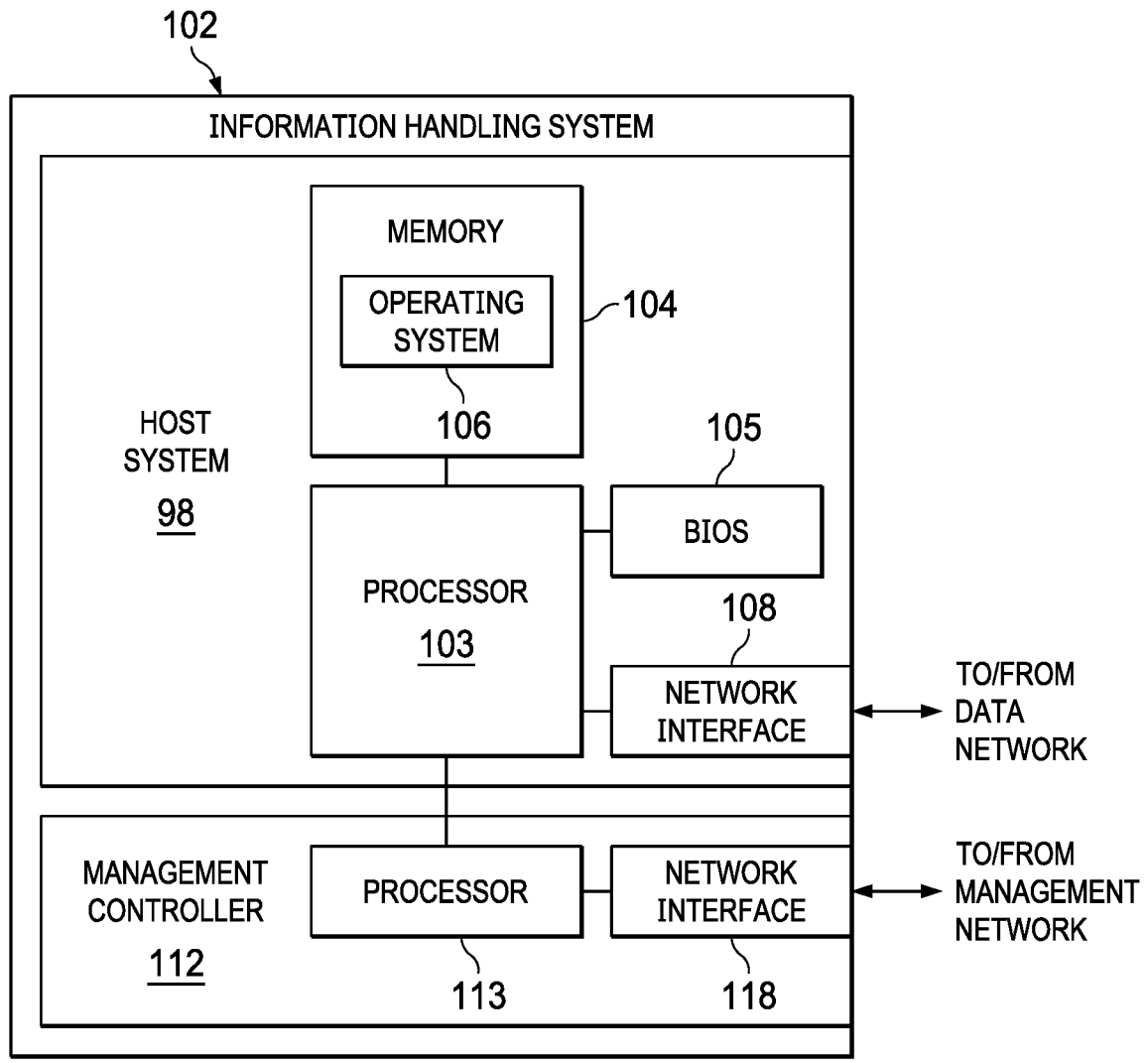
FIG. 1 illustrates a block diagram of an example information handling system, in accordance with embodiments of the present disclosure.
Figure 2:
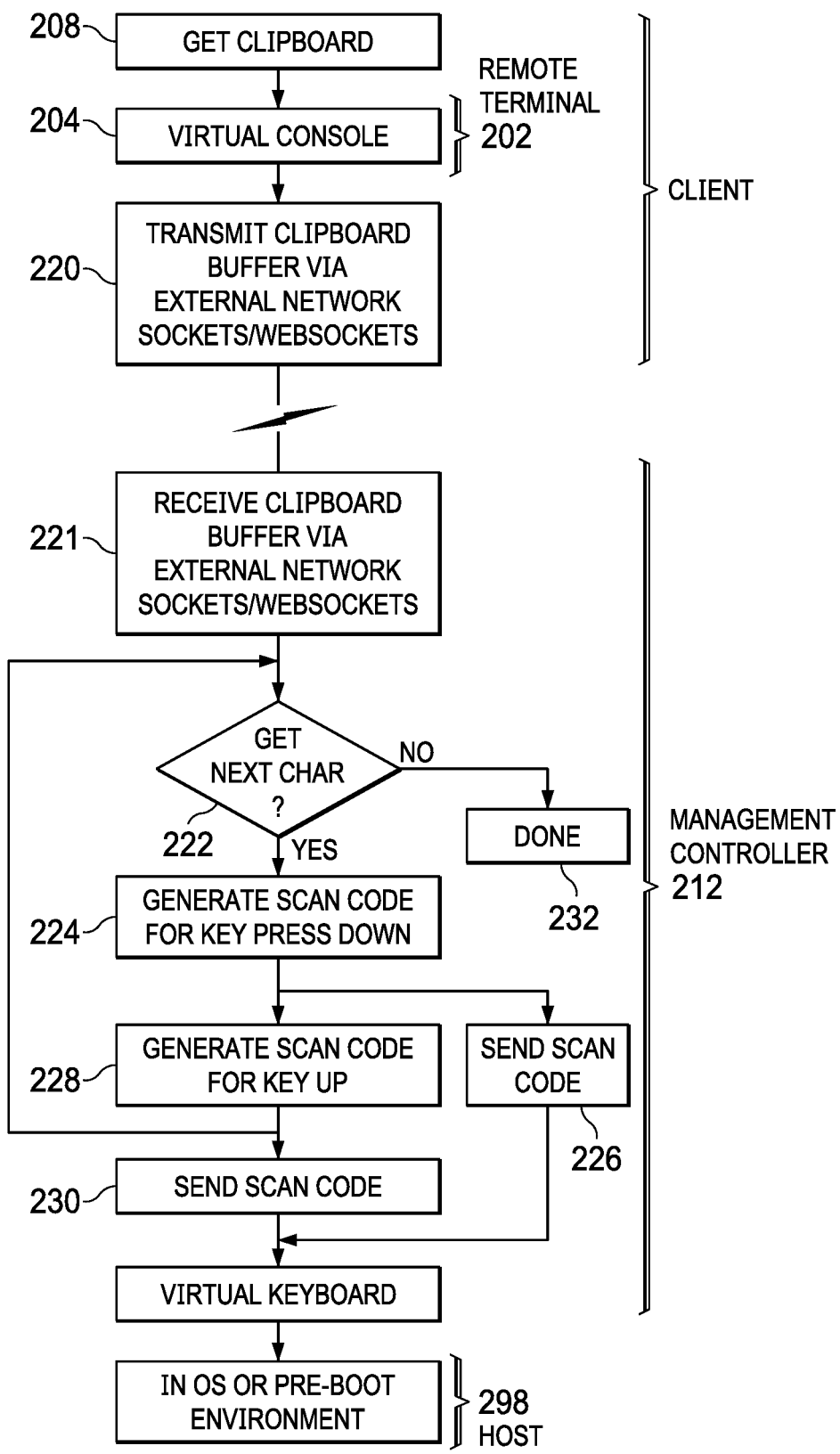
FIG. 2 illustrates an example flow diagram including example information handling systems, in accordance with embodiments of the present disclosure.

Preferred embodiments and their advantages are best understood by reference to FIGS. 1 through 2, wherein like numbers are used to indicate like and corresponding parts.

For the purposes of this disclosure, the term "information handling system" may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For purposes of this disclosure, when two or more elements are referred to as "coupled" to one another, such term indicates that such two or more elements are in electronic communication or mechanical communication, as applicable, whether connected directly or indirectly, with or without intervening elements.

When two or more elements are referred to as "coupleable" to one another, such term indicates that they are capable of being coupled together.

For the purposes of this disclosure, the term "computer-readable medium" (e.g., transitory or non-transitory computer-readable medium) may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; communications media such as wires, optical fibers, microwaves, radio waves, and other electromagnetic and/or optical carriers; and/or any combination of the foregoing.

For the purposes of this disclosure, the term "information handling resource" may broadly refer to any component system, device, or apparatus of an information handling system, including without limitation processors, service processors, basic input/output systems, buses, memories, I/O devices and/or interfaces, storage resources, network interfaces, motherboards, and/or any other components and/or elements of an information handling system.

For the purposes of this disclosure, the term "management controller" may broadly refer to an information handling system that provides management functionality (typically out-of-band management functionality) to one or more other information handling systems. In some embodiments, a management controller may be (or may be an integral part of) a service processor, a baseboard management controller (BMC), a chassis management controller (CMC), or a remote access controller (e.g., a Dell Remote Access Controller (DRAC) or Integrated Dell Remote Access Controller (iDRAC)).

For the purposes of this disclosure, the term "remote terminal" may be used to refer broadly to an information handling system that is configured to couple to a management controller and issue management instructions for an information handling system (e.g., a host system) that is being managed by the management controller. In various embodiments, remote terminals may be implemented via specialized hardware and/or via software running on a standard information handling system.

For the purposes of this disclosure, the term "virtual console" may be used to refer broadly to any program of executable instructions (or aggregation of programs of executable instructions) configured to allow a remote terminal to couple to a management controller of a host system and provide management of that host system. For example, a virtual console may enable remote access to a serial console of the host system via the management controller.

FIG. 1 illustrates a block diagram of an example information handling system 102, in accordance with embodiments of the present disclosure. In some embodiments, information handling system 102 may comprise a server chassis configured to house a plurality of servers or "blades." In other embodiments, information handling system 102 may comprise a personal computer (e.g., a desktop computer, laptop computer, mobile computer, and/or notebook computer). In yet other embodiments, information handling system 102 may comprise a storage enclosure configured to house a plurality of physical disk drives and/or other computer-readable media for storing data (which may generally be referred to as "physical storage resources"). As shown in FIG. 1, information handling system 102 may comprise a processor 103, a memory 104 communicatively coupled to processor 103, a BIOS 105 (e.g., a UEFI BIOS) communicatively coupled to processor 103, a network interface 108 communicatively coupled to processor 103, and a management controller 112 communicatively coupled to processor 103.

In operation, processor 103, memory 104, BIOS 105, and network interface 108 may comprise at least a portion of a host system 98 of information handling system 102. In addition to the elements explicitly shown and described, information handling system 102 may include one or more other information handling resources.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have stored thereon an operating system 106. Operating system 106 may comprise any program of executable instructions (or aggregation of programs of executable instructions) configured to manage and/or control the allocation and usage of hardware resources such as memory, processor time, disk space, and input and output devices, and provide an interface between such hardware resources and application programs hosted by operating system 106. In addition, operating system 106 may include all or a portion of a network stack for network communication via a network interface (e.g., network interface 108 for communication over a data network). Although operating system 106 is shown in FIG. 1 as stored in memory 104, in some embodiments operating system 106 may be stored in storage media accessible to processor 103, and active portions of operating system 106 may be transferred from such storage media to memory 104 for execution by processor 103.

Network interface 108 may comprise one or more suitable systems, apparatuses, or devices operable to serve as an interface between information handling system 102 and one or more other information handling systems via an in-band network. Network interface 108 may enable information handling system 102 to communicate using any suitable transmission protocol and/or standard. In these and other embodiments, network interface 108 may comprise a network interface card, or "NIC." In these and other embodiments, network interface 108 may be enabled as a local area network (LAN)-on-motherboard (LOM) card.

Management controller 112 may be configured to provide management functionality for the management of information handling system 102. Such management may be made by management controller 112 even if information handling system 102 and/or host system 98 are powered off or powered to a standby state. Management controller 112 may include a processor 113, memory, and a network interface 118 separate from and physically isolated from network interface 108.

As shown in FIG. 1, processor 113 of management controller 112 may be communicatively coupled to processor 103. Such coupling may be via a Universal Serial Bus (USB), System Management Bus (SMBus), and/or one or more other communications channels.

Network interface 118 may be coupled to a management network, which may be separate from and physically isolated from the data network as shown. Network interface 118 of management controller 112 may comprise any suitable system, apparatus, or device operable to serve as an interface between management controller 112 and one or more other information handling systems via an out-of-band management network. Network interface 118 may enable management controller 112 to communicate using any suitable transmission protocol and/or standard. In these and other embodiments, network interface 118 may comprise a network interface card, or "NIC." Network interface 118 may be the same type of device as network interface 108, or in other embodiments it may be a device of a different type.

As noted above, management controller 112 may be used to provide remote management access to host system 98 (e.g., via access to operating system 106 or to a pre-boot environment such as a configuration program provided by BIOS 105, etc.).

FIG. 2 illustrates an embodiment in which virtual console 204 executes on remote terminal 202. Virtual console 204 may provide access to host system 298 (e.g., via a host operating system or a pre-boot environment) via management controller 212. In some embodiments, management controller 212 may comprise an iDRAC. As one of ordinary skill in the art with the benefit of this disclosure will readily understand, various other types of management controller may also be used in particular implementations.

As shown, management controller 212 includes various elements of control flow logic for implementing portions of the present disclosure. Such control flow logic may include any program of executable instructions (or aggregation of programs of executable instructions) configured to manage clipboard operations, as discussed in further detail below. In certain embodiments, such control flow logic may be implemented partially or fully in software and/or firmware embodied in computer-readable media.

In some embodiments, virtual console 204 may provide a Java or HTML5 interface (e.g., through the use of a web browser) to management controller 212 (e.g., via a vConsole backend of management controller 212). In some embodiments, other types of virtual console (e.g., ActiveX, VNC, etc.) may also be enabled.

As will be understood by one of ordinary skill in the art with the benefit of this disclosure, management controller 212 may be exposed to host operating system 206 (in whole or in part) via a keyboard interface such as a USB keyboard interface. In particular, management controller 212 may present a virtual keyboard to host system 298 to allow key press information to be transmitted to host system 298.

Such a relatively low-level communications interface between management controller 212 and host system 298 may enable various advantages that would not be available if an operating-system-level interface were being used. In particular, the teachings of this disclosure may be implemented in an agentless fashion, requiring no specialized software to be installed on host system 298. Indeed, in some embodiments, a host operating system may not even be present.

For example, key press information may be transmitted to host system 298 even before a host operating system has been booted. In this way, key press information may be provided to a pre-boot environment of host system 298. In other embodiments, key press information may be provided to host system 298 after such a host operating system has been booted, but before a user has been logged in. For example, user credentials (e.g., username, password, security keys, etc.) may be transmitted as key press information sent via such a virtual keyboard interface.

In some embodiments, virtual console 204 may interact with clipboard functionality of remote terminal 202. For example, virtual console 204 may implement a function 208 for getting clipboard buffer information from remote terminal 202. A user of remote terminal 202 may desire to transmit information to host system 298, may copy such information to a local clipboard buffer of remote terminal 202, and may then initiate a paste command or the like from virtual console 204.

Once the clipboard buffer information has been obtained at virtual console 204 (e.g., obtained from an operating system of remote terminal 202 and in response to a specialized paste command of virtual console 204), it may be transmitted to management controller 212 and step 220. (These portions of FIG. 2 are shown collectively as taking place on a client information handling system.) For example, this information may be transmitted via an external network sockets/websockets interface. In various embodiments, any suitable data structure may be used to encapsulate the clipboard buffer information for transmission.

Once management controller 212 has received the clipboard buffer information at step 221, the control flow logic shown in FIG. 2 may implement a loop as shown to transmit the information to host system 298 by "playing back" the clipboard buffer information as textual data in a character-by-character fashion via a keyboard interface.

In particular, management controller 212 may process clipboard buffer information in a loop as follows. While any unprocessed clipboard buffer information remains, management controller 212 may repeatedly get the next character of such information at step 222. For each such character, management controller 212 may first generate a keyboard scan code corresponding to a key down event for such character at step 224. Such keyboard scan code may then be sent via the virtual keyboard interface to host system 298 at step 226.

Subsequently, a corresponding key up event for that character may be generated at step 228. The key up event scan code may also be sent via the virtual keyboard interface to host system 298 at step 230.

Management controller may then proceed in a loop as shown, processing each character of the clipboard buffer information in turn, until no more unprocessed characters remain. At step 232, the method ends.

In some embodiments, the keyboard scan codes transmitted via the virtual keyboard interface may be dependent on various elements of keyboard state. For example, the presence or absence of caps lock, shift, numerical lock, scroll lock, etc. settings may change the values of such scan codes. In some embodiment, such settings may be determined by virtual console 204, for example, based upon the state of a physical keyboard coupled to remote terminal 202.

One of ordinary skill in the art with the benefit of this disclosure will understand that the preferred initialization point for the method depicted in FIG. 2 and the order of the steps comprising that method may depend on the implementation chosen. In these and other embodiments, this method may be implemented as hardware, firmware, software, applications, functions, libraries, or other instructions. Further, although FIG. 2 discloses a particular number of steps to be taken with respect to the disclosed method, the method may be executed with greater or fewer steps than those depicted. The method may be implemented using any of the various components disclosed herein (such as the components of FIG. 1), and/or any other system operable to implement the method.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Further, reciting in the appended claims that a structure is "configured to" or "operable to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke § 112(f) during prosecution, Applicant will recite claim elements using the "means for [performing a function]" construct.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. An information handling system comprising:
a host system including a host system processor and a host system memory coupled to the host system processor; and
a management controller configured to provide out-of-band management of the host system, wherein the management controller is configured to:
establish a virtual console session between the host system and a remote terminal;
implement a virtual keyboard coupled to a keyboard interface of the host system;
in response to a command from the remote terminal to send data from the remote terminal to the host system, receive the data from the remote terminal, wherein the command includes a paste command associated with the data, and wherein the data was previously copied into a clipboard buffer at the remote terminal; and
transmit the data via the virtual keyboard to the host system character-by-character via the keyboard interface of the host system, wherein the virtual keyboard is configured to allow agentless data transmission from the management controller to the host system without execution of a software agent on the host system, wherein the host system is configured to receive the data in a pre-boot environment and/or while no user is logged into an operating system (OS) of the host system.

2. The information handling system of claim 1, wherein the keyboard interface of the host system is a Universal Serial Bus (USB) interface.

3. The information handling system of claim 1, wherein transmitting the data to the host system includes transmitting a key down event and a key up event for each character of the data.

4. The information handling system of claim 1, wherein the transmitted data is based on at least one of a caps lock status and a numeric lock status.

5. The information handling system of claim 1, wherein the data comprises a password for a user, and wherein the transmitting is configured to allow the user to log in to the host system with the password.

6. A method comprising:
establishing, by a management controller that is configured to provide out-of-band management of a host system of an information handling system, a virtual console session between the host system and a remote terminal;
implementing, by the management controller, a virtual keyboard coupled to a keyboard interface of the host system;
in response to a command from the remote terminal to send data from the remote terminal to the host system, the management controller receiving the data from the remote terminal, wherein the command includes a paste command associated with the data, and wherein the data was previously copied into a clipboard buffer at the remote terminal; and the management controller transmitting the data via the virtual keyboard to the host system character-by-character via the keyboard interface of the host system, wherein the virtual keyboard allows agentless data transmission from the management controller to the host system without execution of a software agent on the host system, wherein the host system is configured to receive the data in a pre-boot environment and/or while no user is logged into an operating system (OS) of the host system.

7. The method of claim 6, wherein the virtual console session is initiated by the remote terminal.

8. The method of claim 6, wherein the pre-boot environment includes an interface of a Basic Input/Output System (BIOS) of the host system.

9. An article of manufacture comprising a non-transitory, computer-readable medium having computer-executable code thereon that is executable by a processor of a management controller of an information handling system for:

establishing a virtual console session between a host system of the information handling system and a remote terminal;

implementing a virtual keyboard coupled to a keyboard interface of the host system;

in response to a command from the remote terminal to send data from the remote terminal to the host system, receiving the data from the remote terminal, wherein the command includes a paste command associated with the data, and wherein the data was previously copied into a clipboard buffer at the remote terminal; and transmitting the data via the virtual keyboard to the host system character-by-character via the keyboard interface of the host system, wherein the virtual keyboard allows agentless data transmission from the management controller to the host system without execution of a software agent on the host system, wherein the host system is configured to receive the data in a pre-boot environment and/or while no user is logged into an operating system (OS) of the host system;

wherein the management controller is configured to provide out-of-band management of the host system.

10. The article of claim 9, wherein the keyboard interface is a Universal Serial Bus (USB) interface.

11. The article of claim 9, wherein transmitting the data to the host system includes transmitting a key down event and a key up event for each character of the data.

12. The article of claim 9, wherein the data comprises a password for a user, and wherein the transmitting is configured to allow the user to log in to the host system with the password.

* * * * *